(12) United States Patent
Kurisaki et al.

(10) Patent No.: US 7,415,895 B2
(45) Date of Patent: Aug. 26, 2008

(54) FLOW METER WITH A RECTIFYING MODULE HAVING A PLURALITY OF MESH MEMBERS

(75) Inventors: Shogo Kurisaki, Tokyo (JP); Koichi Katsumata, Joso (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/464,595

(22) Filed: Aug. 15, 2006

(65) Prior Publication Data

US 2007/0044573 A1 Mar. 1, 2007

(30) Foreign Application Priority Data

Aug. 26, 2005 (JP) .............................. 2005-246216

(51) Int. Cl.
*G01F 1/37* (2006.01)

(52) U.S. Cl. .................................................. 73/861.52

(58) Field of Classification Search .............. 73/861.52; 137/545; 210/336, 489, 498
See application file for complete search history.

(56) References Cited

U.S. PATENT DOCUMENTS

| | | | | | |
|---|---|---|---|---|---|
| 3,645,133 | A | * | 2/1972 | Simeth et al. ............. | 73/204.15 |
| 5,014,552 | A | * | 5/1991 | Kamiunten et al. ....... | 73/204.21 |
| 5,081,866 | A | * | 1/1992 | Ochiai et al. ............. | 73/204.21 |
| 5,230,245 | A | * | 7/1993 | Kamiunten et al. ........... | 73/195 |
| 5,596,969 | A | * | 1/1997 | Lipinski ..................... | 123/494 |
| 6,952,960 | B2 | * | 10/2005 | Nozoe et al. .............. | 73/204.21 |
| 7,059,184 | B2 | * | 6/2006 | Kanouda et al. ........... | 73/202.5 |
| 7,100,440 | B2 | * | 9/2006 | Morisawa et al. ......... | 73/204.22 |
| 2004/0163461 | A1 | * | 8/2004 | Ito et al. ................... | 73/204.21 |
| 2004/0261519 | A1 | | 12/2004 | Nozoe et al. | |
| 2007/0017303 | A1 | * | 1/2007 | Fujiwara et al. ........... | 73/861.52 |

FOREIGN PATENT DOCUMENTS

| | | |
|---|---|---|
| JP | 8-285659 | 11/1996 |
| JP | 2004-93170 | 3/2004 |
| JP | 2005-24352 | 1/2005 |

* cited by examiner

*Primary Examiner*—Harshad Patel
(74) *Attorney, Agent, or Firm*—Paul A. Guss

(57) ABSTRACT

A rectifying module is arranged on an upstream side of a flow passage containing a flow velocity sensor. The rectifying module includes mesh members each having a plurality of circular small holes and ring-shaped spacers, wherein the mesh members and the spacers are alternately stacked in an axial direction and integrally joined to one another by means of thermal diffusion bonding. The mesh members have identical structures, in which the plurality of small holes are arranged concentrically at angles of separation of 60 degrees in the circumferential direction about the center of a reference small hole. The small holes are formed over the entire surface of the mesh member continuous with adjoining other small holes. The small holes of one mesh member and another mesh member adjacent thereto in the axial direction are arranged so as to have a phase angle difference of 90 degrees in the circumferential direction.

8 Claims, 8 Drawing Sheets

FLOW METER WITH A RECTIFYING MODULE HAVING A PLURALITY OF MESH MEMBERS

BACKGROUND OF THE INVENTION

1. Field of the Invention

The present invention relates to a flow meter capable of detecting the flow rate of a fluid.

2. Description of the Related Art

A flow meter has been widely used, in which a flow velocity sensor is arranged within a fluid flow passage (piping) for a gas, for example, in order to measure the flow rate of the gas that flows through the flow passage using the flow velocity sensor.

The flow meter comprises, for example, a detecting section for rectifying and sensing the gas, a signal processing section for processing a signal derived from the detecting section, and a display section. A subminiature flow sensor is attached to an inner wall surface of a flow passage of the detecting section, which serves as the flow velocity sensor. The signal processing section calculates a cumulative flow rate and an instantaneous flow rate, on the basis of a detection signal fed from the flow sensor, wherein the obtained result is displayed on the display section.

In this arrangement, a plurality of wire meshes are arranged at constant intervals on an upstream side of the flow velocity sensor, which function as rectifying elements for suppressing uneven flow disturbances in the gas that flows through the flow passage. For example, Japanese Laid-Open Patent Publication No. 2004-93170 discloses an arrangement in which a fine metal mesh is arranged at an uppermost stream position of the flow velocity sensor, and a plurality of other metal meshes, having gradually coarser mesh sizes, are arranged with the finest mesh positioned at the downstream side, while the meshes are separated from each other by predetermined distances.

However, the technical concept disclosed in Japanese Laid-Open Patent Publication No. 2004-93170 requires that a plurality of spacers and metal meshes be alternately installed, respectively, along the inner wall surface of the flow passage in the fluid flow direction. Therefore, the assembly operation is complicated. Further, in the industrial field to which the invention pertains, an increase in the rectifying effect has been sought.

SUMMARY OF THE INVENTION

A general object of the present invention is to provide a flow meter in which a plurality of mesh members and spacers are integrated into a module, so that assembly operations can be performed more conveniently.

A principal object of the present invention is to provide a flow meter, in which further advancements in the rectifying effect thereof can be achieved.

According to the present invention, a plurality of mesh members are used, the mesh members having an identical structure including a plurality of small holes, which are arranged concentrically, and which are separated from each other by equal angles in the circumferential direction about a center of a small reference hole. Further, the mesh members are arranged in a continuous relationship, wherein a phase angle difference is provided in a circumferential direction between one mesh member and another mesh member, which are adjacent to each other.

Therefore, according to the present invention, overlapping portions are provided between the circular small holes of one mesh member and the circular small holes of another mesh member stacked in relation thereto. The area of the passage in which the pressure fluid passes through the overlapping portions is decreased in order to effect a throttling function, as compared with an unillustrated mesh member according to the conventional technique, in which the meshes are lattice-shaped (square or rectangular). Accordingly, an improvement in rectifying effect thereof can be achieved.

Further, according to the present invention, a module is constructed, which includes mesh members formed with a plurality of circular small holes therein and ring-shaped spacers, wherein the mesh members and the spacers are alternately stacked in an axial direction. Accordingly, assembly of the module can be performed conveniently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
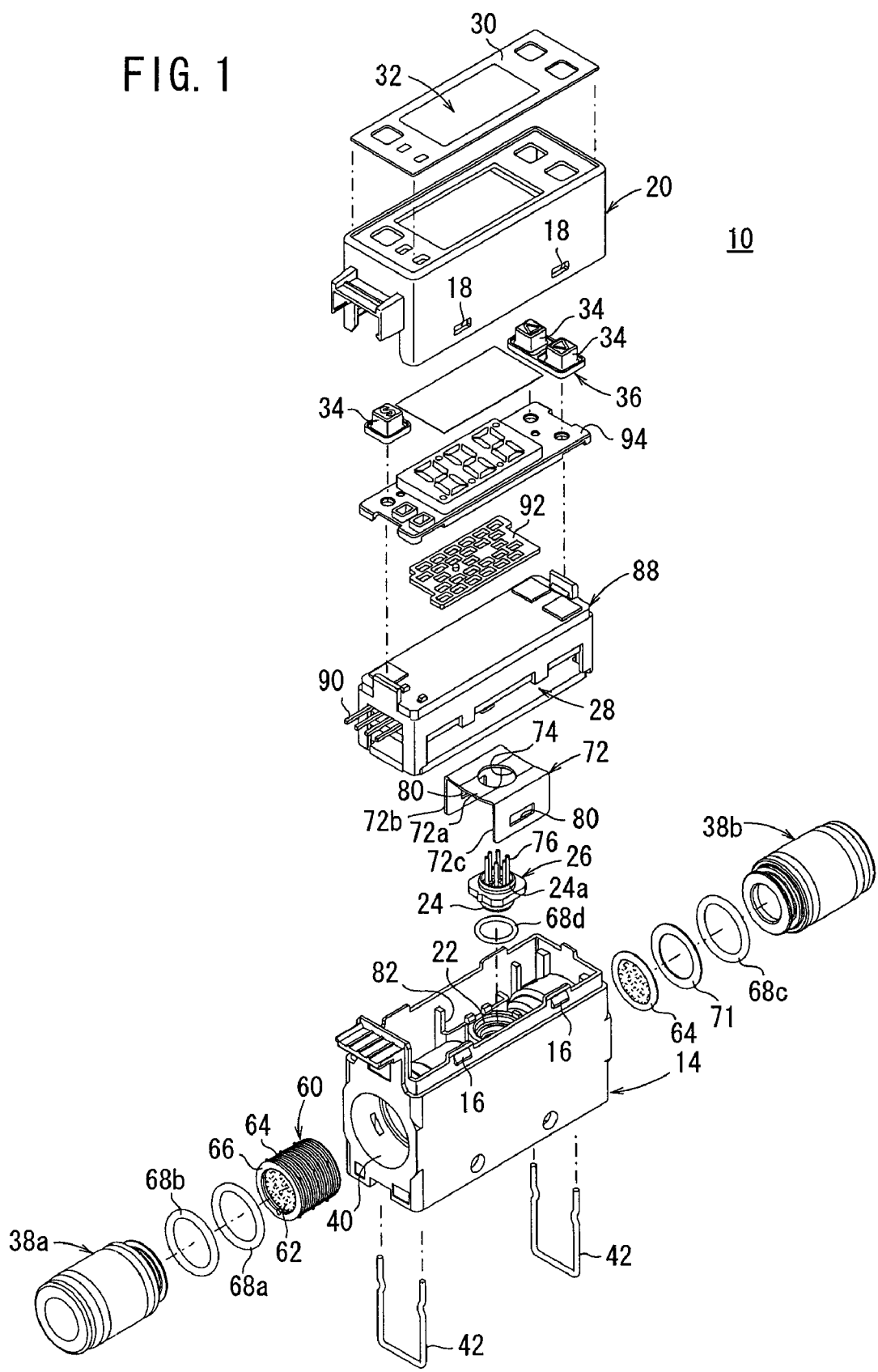
FIG. 1 is an exploded perspective view illustrating a flow meter according to an embodiment of the present invention.

With reference to FIG. 1, reference numeral 10 indicates a flow meter according to an embodiment of the present invention.

The flow meter 10 comprises a body 14 made of resin, which is substantially rectangular parallelepiped-shaped, and includes a flow passage 12 (see FIG. 2) having a circular cross section that penetrates from one end surface to the other end surface in the axial direction through which a fluid to be measured flows. A rectangular parallelepiped-shaped housing 20 is provided, which is integrally assembled on an upper portion of the body 14 through engagement of rectangular holes 18 with pawls 16 that are formed on the body 14. In this arrangement, the body 14 and housing 20 function as a main body section.

The flow meter 10 further comprises a detecting section 26, which includes a flow velocity sensor 24 facing the flow passage 12 with a seating surface (seating section) of a circular opening 22 formed on the body 14, a control unit 28 provided in the housing 20 and which calculates, for example, a cumulative flow rate or an instantaneous flow rate on the basis of the detection signal output from the flow velocity sensor 24, a display section 32 having a display panel 30 disposed on an upper portion of the housing 20 and which displays, for example, the cumulative flow rate calculated by the control unit 28, and an operation section 36 including a plurality of switches 34 arranged on the upper surface of the housing 20.

A cylindrical first hole 40 is formed at one end of the body 14, into which a first joint section 38a is inserted, which functions as an inlet port. The first joint section 38a is retained in the body 14 by a bent joint-fastening fixture 42, which is substantially U-shaped.

Figure 2:
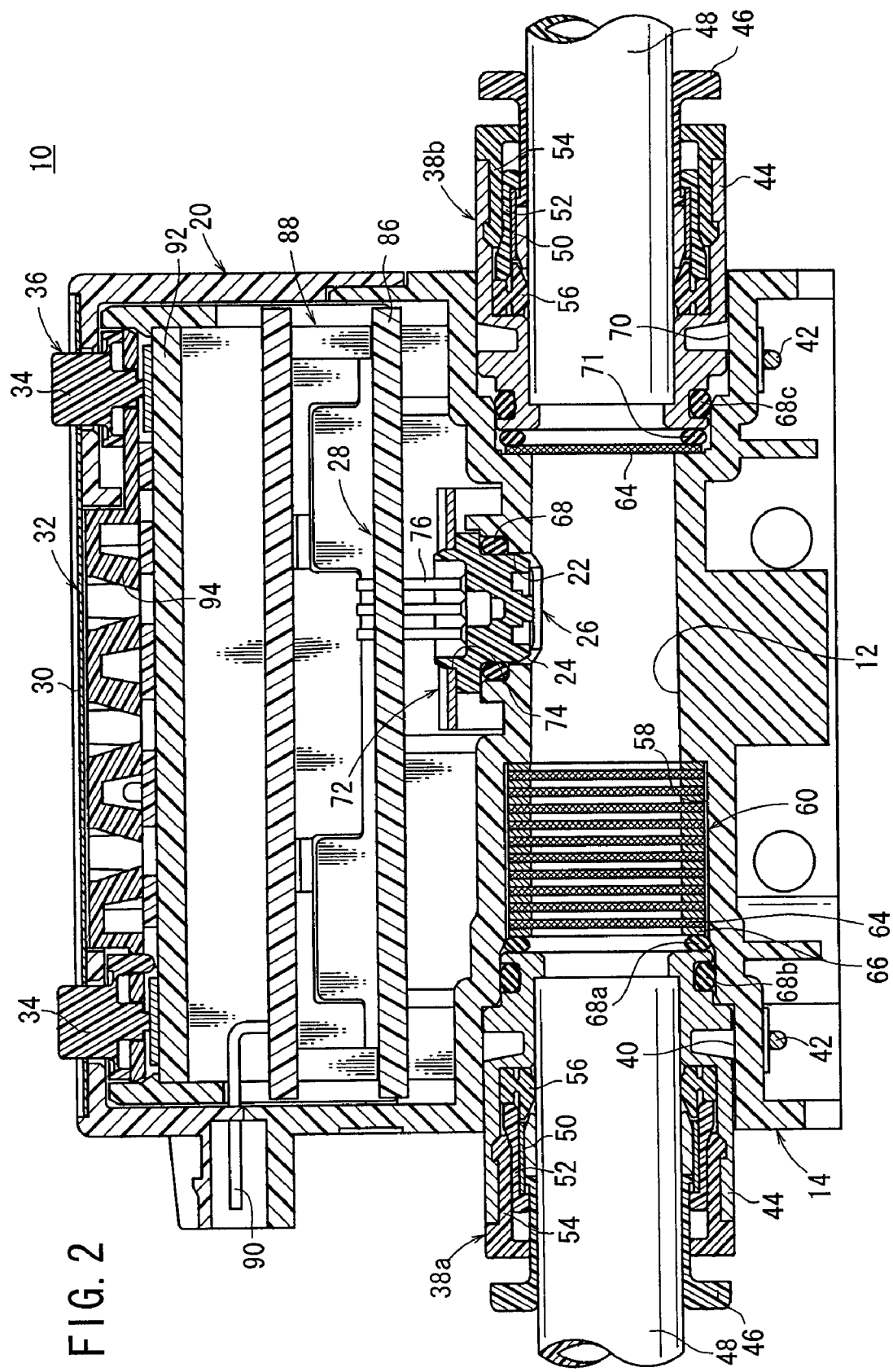
FIG. 2 is a longitudinal sectional view, taken in the axial direction, illustrating the flow meter shown in FIG. 1.

As shown in FIG. 2, the first joint section 38a includes a joint body 44 composed of a cylindrical metal member, a release bush 46 installed in the opening disposed at one end of the joint body 44, a chuck member 50 having a pawl for fastening a tube member 48 made of resin, which is to be inserted into the hole of the joint body 44, a collet 52 and a guide member 54 that are arranged on the outer diameter side of the chuck member 50, and a seal member 56, which effects sealing by surrounding the outer circumferential surface of the tube member 48 that is inserted into the hole of the joint body 44.

A reduced diameter hole 58 (see FIG. 2), which is contiguous with the first hole 40 and has a diameter slightly reduced as compared with the first hole 40, is formed in the flow passage 12 of the body 14. A rectifying module 60, which acts to avoid disturbances in the flow velocity and to uniformize the flow velocity distribution, is arranged within the reduced diameter hole 58.

Figure 4:
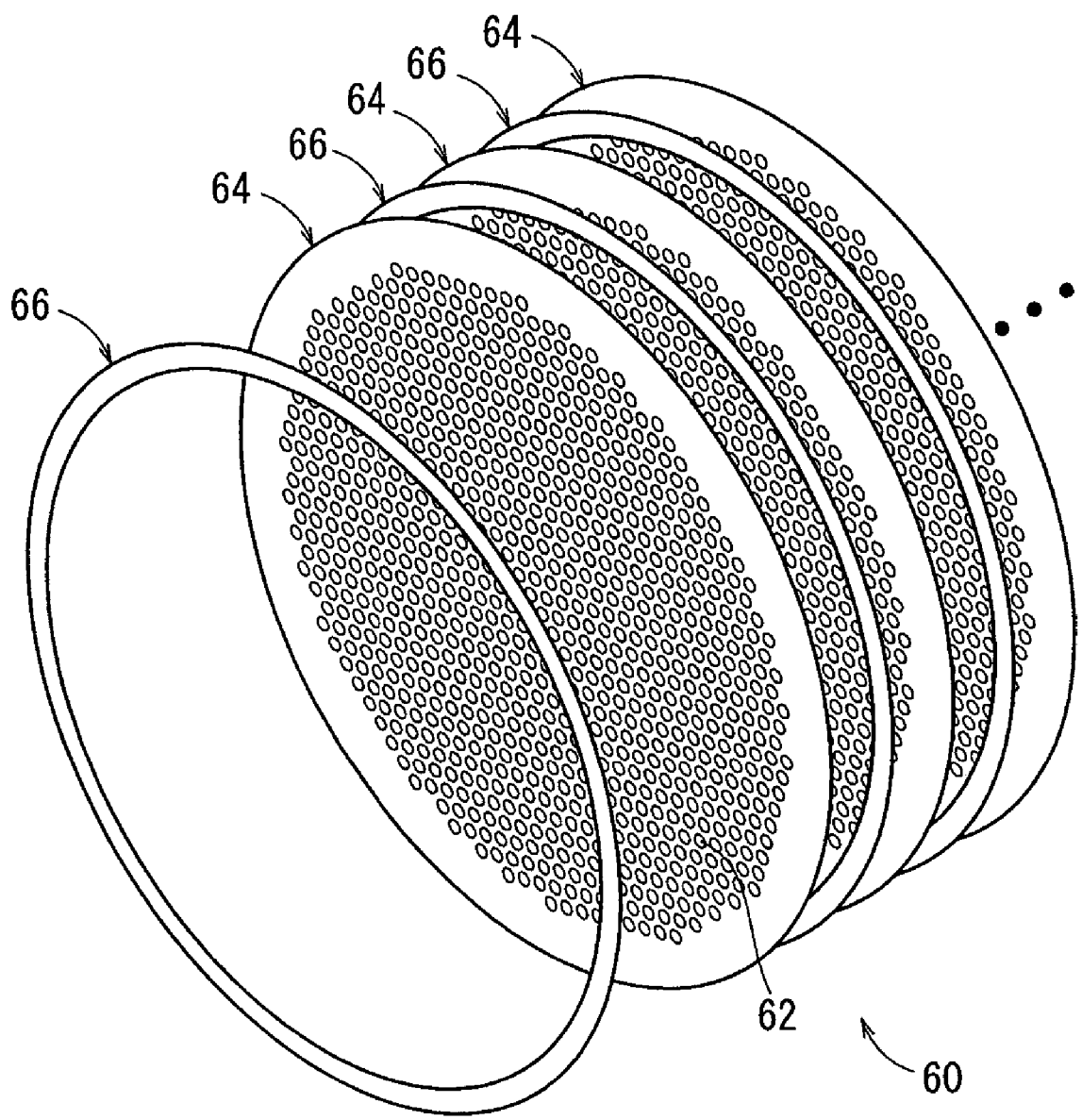
FIG. 4 is an exploded perspective view illustrating a rectifying module of the flow meter shown in FIG. 1.
Figure 5:
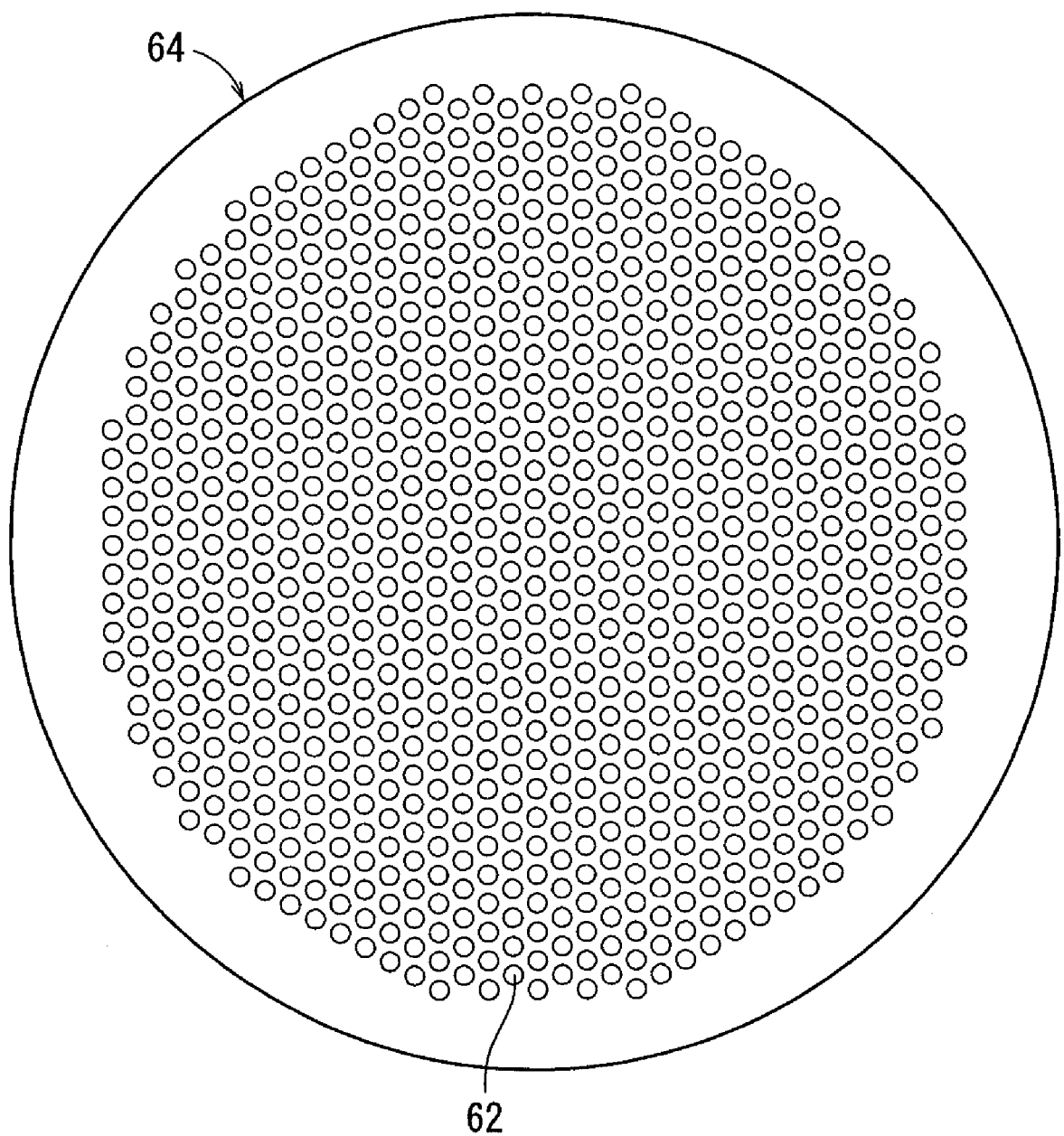
FIG. 5 is a plan view illustrating a mesh member making up the rectifying module of the flow meter shown in FIG. 1.

As shown in FIGS. 4 and 5, the rectifying module 60 includes mesh members 64 and spacers 66. The mesh member 64 includes a plurality of circular small holes 62, which are bored in a meshed form. The spacer 66 is composed of a ring member having the same outer diameter as the outer diameter of the mesh member 64. The mesh members 64 and the spacers 66 are alternately joined in abutment with one another in the axial direction, so that a cylindrical member is formed thereby, and they are integrally joined together into a unit by means of thermal diffusion bonding.

That is, the plurality of mesh members 64 and the spacers 66 are alternately arranged using an unillustrated friction press contact mechanism. In this state, the mesh members 64 and the spacers 66 are relatively rotated to heat and pressurize their contact surfaces, so that they become integrally joined into a stacked member, utilizing a diffusion phenomenon generated between their respective joining surfaces.

Figure 6:
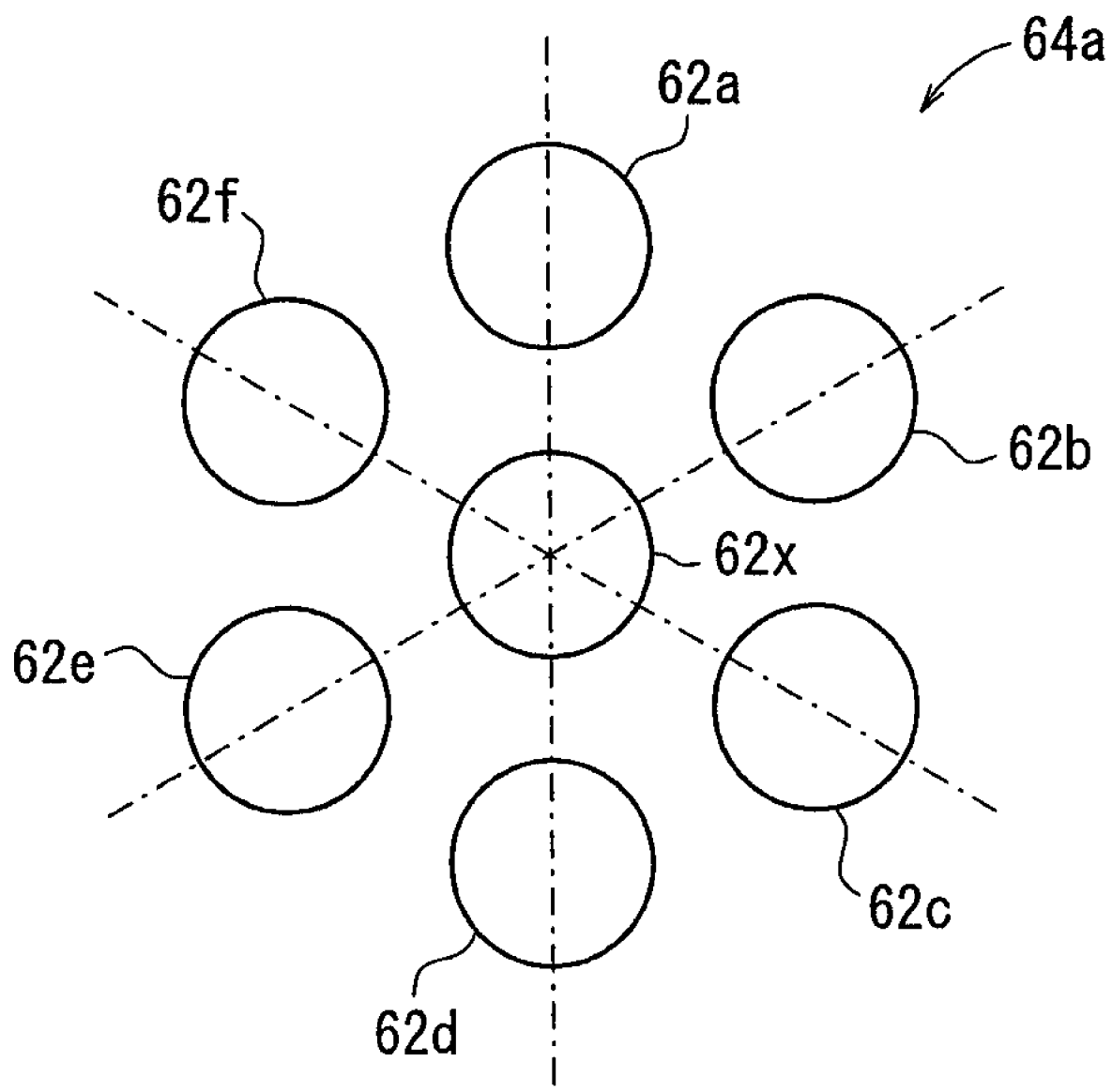
FIG. 6 is a plan view illustrating an arrangement of small holes formed in one adjoining mesh member of the flow meter shown in FIG. 1.

Each of the plurality of mesh members 64 has an identical shape respectively. As shown in FIG. 6, the six small holes 62a to 62f are concentrically arranged respectively at angles of separation of 60 degrees in the circumferential direction, about the center of a small hole 62x, which serves as a reference circle. This relationship continues with respect to the adjoining small holes 62a to 62f, wherein the small holes 62 are formed over substantially the entire surface of the mesh member 64 (see FIG. 8).

A phase angle difference of 90 degrees is provided in the circumferential direction, between one mesh member 64a and another adjacent mesh member 64b, with the spacer 66 intervening therebetween. Such a phase angle difference is applied to all of the adjoining mesh members 64. The phase angle difference of 90 degrees may be in circumferential directions of either a clockwise direction or a counterclockwise direction, between the mesh member 64a and the other adjacent mesh member 64b.

Figure 7:
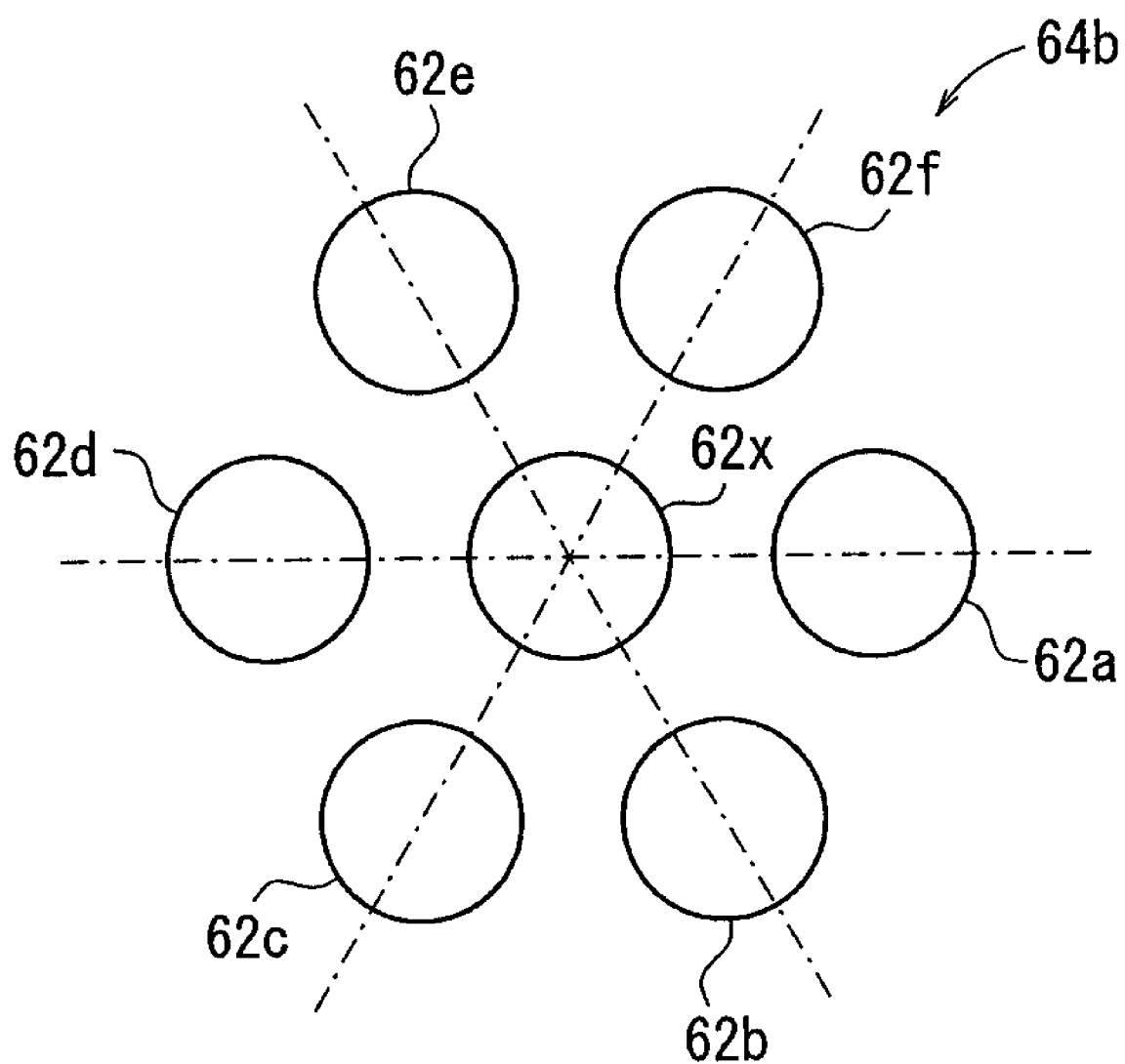
FIG. 7 is a plan view illustrating an arrangement of small holes formed in another adjoining mesh member of the flow meter shown in FIG. 1.
Figure 8:
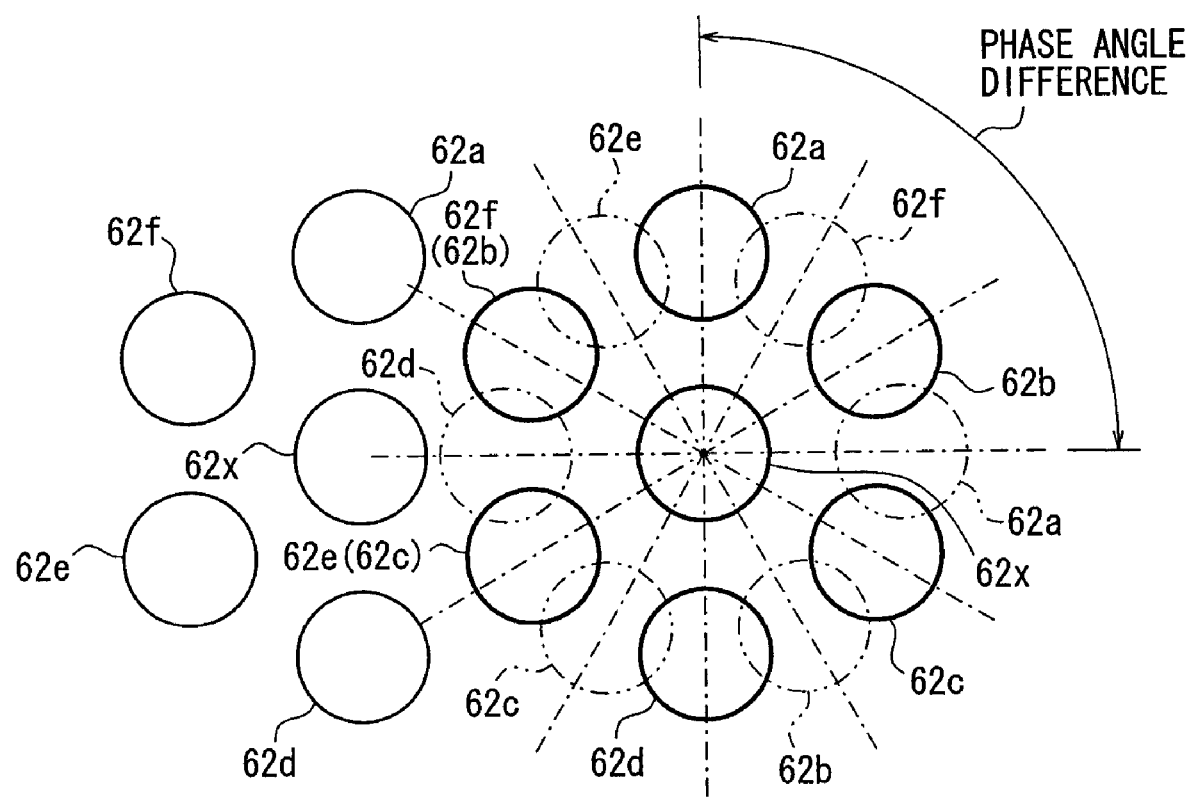
FIG. 8 is a plan view illustrating a difference in phase angle between the small holes formed in one mesh member and the small holes formed in the other mesh member of the flow meter shown in FIG. 1.

An explanation shall be given concerning principles of operation of the invention, in order to facilitate comprehensive understanding. For example, the arrangement of the small holes 62a to 62f of one mesh member 64a is shown in FIG. 6, and the arrangement of the small holes 62a to 62f of the other mesh member 64b is shown in FIG. 7. As clearly understood by comparing FIG. 6 and FIG. 7, with this arrangement, a phase angle difference of 90 degrees is provided. FIG. 8 shows the small holes 62a to 62f of one mesh member 64a (see solid lines) and the small holes 62a to 62f of the other mesh member 64b (see two-dot chain lines) in an overlapped state, which are arranged with a phase angle difference of 90 degrees as described above. As shown in FIG. 8, the overlapping portions (coincident portions at which the two circles having the same diameter intersect) between the circular small holes 62a to 62f of one stacked mesh member 64a and the circular small holes 62a to 62f of the other stacked mesh member 64b are formed in a substantially convex lens-shaped form, in which the thickness is greatest at the center of the circular arc and becomes gradually thinner in directions toward the points of intersection of the two circles (as depicted by the solid lines and the two-dot chain lines shown in FIG. 8).

Therefore, in the embodiment of the present invention, the passage area formed by meshes of the mesh members through which the pressure fluid passes is decreased as compared with, for example, an unillustrated mesh member in accordance with the conventional technique, in which the meshes thereof are lattice-shaped (square or rectangular). A throttling action is exerted on the pressure fluid that flows through the overlapping portions, which are substantially convex lens-shaped as described above. Accordingly, an advanced rectifying effect can be achieved.

As described above, the plurality of mesh members 64 and the spacers 66 are integrally joined to one another, in order to provide a cylindrical form, in which the mesh direction of one mesh member 64a is rotated by 90 degrees in the circumferential direction with respect to the other mesh member 64b disposed adjacent thereto. Accordingly, the effect of the rectifying function can be further enhanced.

Further, the respective small holes 62 of the mesh members 64 are circular. Accordingly, production can be easily performed, for example, by means of etching (photoetching), so that production costs can be reduced, as compared with the unillustrated mesh member according to the conventional technique, in which the meshes are rectangular or lattice-shaped. That is, if a mesh member composed of a plurality of rectangular and lattice-shaped small holes were produced by means of etching (photoetching), it would be difficult to form the corner shapes of such lattices. However, when the small holes 62 are circular, as in the embodiment of the present invention, production thereof by means of etching can be performed with ease. The plurality of mesh members 64, in which small holes 62 are formed by means of etching, are then cut into a circular form utilizing wire cut electric discharge processing, and the mesh members 64 are separated into units each having an appropriate number of stacked members. Accordingly, individual rectifying modules 60 are obtained.

An O-ring 68a is interposed between the first joint section 38a and the rectifying module 60. Another O-ring 68b is installed in an annular groove formed at the end of the first joint section 38a.

A cylindrical second hole 70 is formed at the other end of the body 14, into which a second joint section 38b that functions as an outlet port is inserted. The second joint section 38b has the same structure as that of the first joint section 38a, and is retained in the body 14 by a joint-fastening fixture 42 having a substantially U-shaped bent form.

An O-ring 68c is installed in an annular groove at the end of the second joint section 38b. A gasket 71 and a single mesh member 64 are interposed between an annular step of the body 14 that forms the flow passage 12 and the end of the second joint section 38b.

A circular opening 22, which communicates with the flow passage 12, is formed in an upper portion of the body 14. The flow velocity sensor 24, which uses the opening 22 as a seating surface, is installed in the opening 22 through the aid of a clip member 72. An O-ring 68d, which seals the seating surface, is installed in the opening 22.

Figure 3:
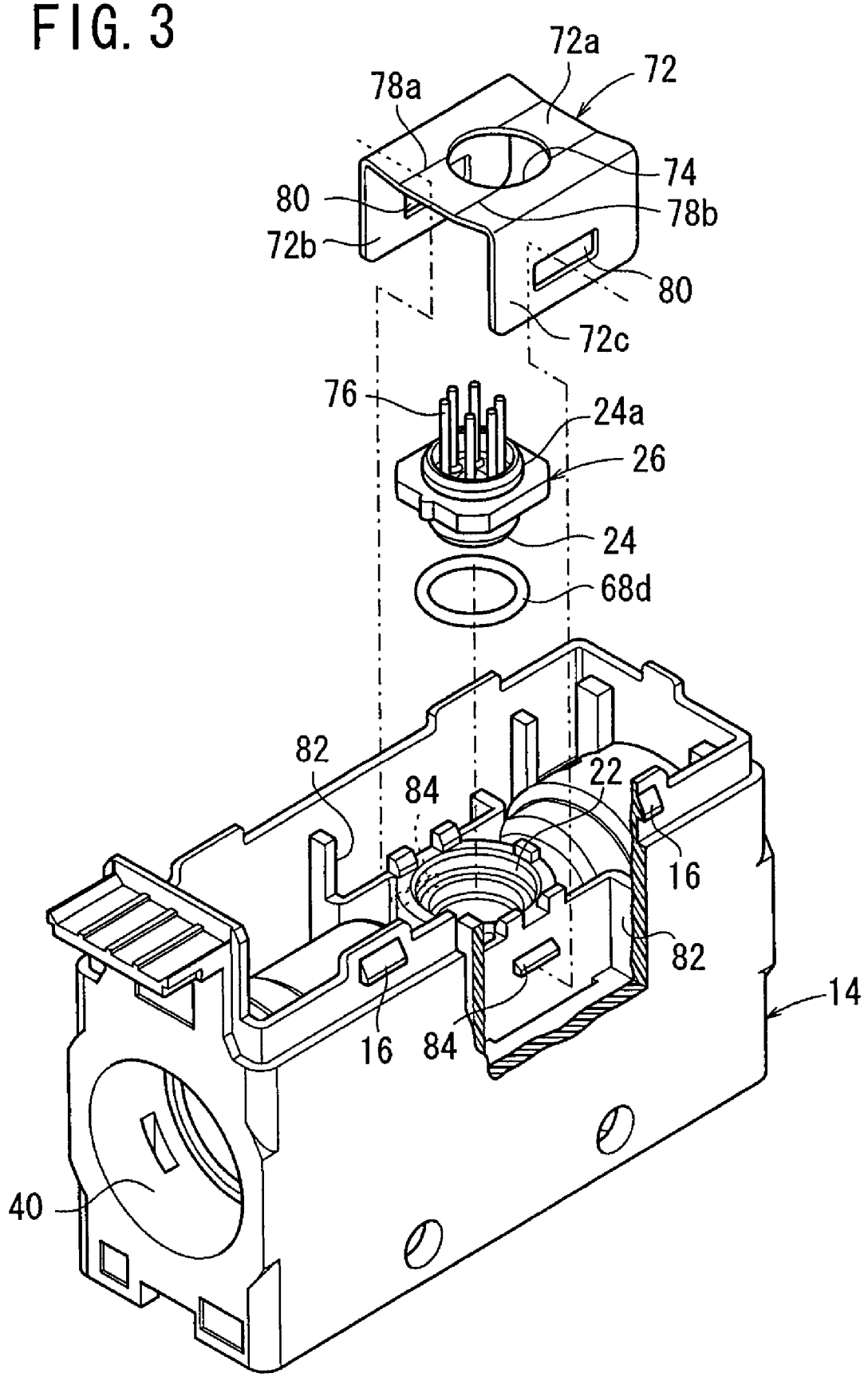
FIG. 3 is an exploded perspective view illustrating a state in which a flow velocity sensor is fixed by a clip member to a seating surface of a body of the flow meter shown in FIG. 1.

As shown in FIG. 3, the clip member 72 includes a plate section 72a having a circular retaining hole 74, which retains the flow velocity sensor 24 through engagement with an annular projection 24a thereof, and a pair of legs 72b and 72c, which are formed on both sides of the plate section 72a while being bent in a direction perpendicular to the plate section 72a. The plate section 72a and the pair of legs 72b, 72c are integrally formed, for example, from a metal material such as stainless steel. The flow velocity sensor 24 is constructed as a module, including a flow sensor element and a plurality of terminal pins 76 electrically connected thereto.

In this arrangement, as shown in FIG. 3, first and second linear stepped sections 78a, 78b, which are parallel to the axis, are formed in the plate section 72a. Accordingly, a spring property can be applied, which acts as a force causing the pair of legs 72b, 72c to approach one another. Fastening sections 80 composed of holes having rectangular cross sections are formed through the pair of legs 72b, 72c respectively. The fastening sections 80 engage with pawls 84 formed on the inner walls of recesses 82 of the body 14. Accordingly, the flow velocity sensor 24 can conveniently be retained by the clip member 72.

For example, the O-ring 68d is installed on the seating surface of the circular opening 22, and then the flow velocity sensor 24 is placed on the seating surface in a state in which the plurality of terminal pins 76 are directed upwardly. The legs 72b, 72c of the clip member 72 are inserted into the recesses 82 of the body 14 from an upper portion of the body 14. In this situation, the pair of fastening pawls 84, which expand on the inner walls of the recesses 82 of the body 14, expand the pair of legs 72b, 72c so as to ride thereover. Thereafter, the fastening pawls 84 engage with the fastening sections 80 of the legs 72b, 72c. Further the retaining hole 74 of the plate section 72a engages with the annular projection 24a of the flow velocity sensor 24. Accordingly, the flow velocity sensor 24 is fixed to the body 14 while being positioned at a predetermined location.

As described above, in the embodiment of the present invention, a clip member 72 having a simple structure is used, which includes the substantially flat plate-shaped plate section 72a and the pair of bent legs 72b, 72c on both sides of the plate section 72a. Accordingly, the flow velocity sensor 24 can be conveniently fixed to the seating surface of the body 14. Therefore, assembly operations can be simplified.

A circuit board unit 88, including a circuit board 86 electrically connected to the plurality of terminal pins 76, is arranged over the flow velocity sensor 24. The circuit board unit 88 functions as a control unit CONT. The circuit board unit 88 may be provided with, for example, an unillustrated microcomputer chip, an unillustrated operation unit, which calculates the flow rate of the fluid to be measured on the basis of a detection signal fed from the flow velocity sensor 24, an unillustrated memory which stores beforehand a correction coefficient used when corrections are performed by the operation unit based on flow rate characteristics corresponding to the type of fluid to be measured, and an output terminal section 90 which outputs, as flow rate data, the detection signal fed from the flow velocity sensor 24. An LED spacer 92 and an LED case 94, functioning as a display section 32, are carried on the upper surface of the circuit board unit.

The flow meter 10 according to the embodiment of the present invention is basically constructed as described above. Next, its operations, functions and effects shall be explained.

A predetermined switch 34 of the operation section 36 is depressed to select and set the fluid to be measured. The fluid to be measured is introduced into the flow passage 12 from the side of the inlet port (the side of the first joint section 38a). The fluid to be measured is rectified by the rectifying module 60, which is constructed integrally by the plurality of mesh members 64 and the spacers 66.

In this arrangement, the mesh members 64, including the plurality of concentric small holes 62 and the ring-shaped spacers 66, are stacked. The plurality of mesh members 64 and the spacers 66 are integrally joined to each other in a cylindrical form, by means of thermal diffusion bonding, in a state in which the mesh direction of one mesh member 64a is rotated by 90 degrees in the circumferential direction with respect to another mesh member 64b adjacent thereto.

The fluid to be measured, which is rectified by the rectifying module 60, has a flow velocity that is detected by the flow velocity sensor 24. The derived detection signal is supplied to the circuit board unit 88 through terminal pins 76 of the flow velocity sensor 24. The detection signal is output as flow velocity data, for example, to an external control mechanism, such as an unillustrated controller, from the output terminal section 90, after being subjected to predetermined signal conversion and signal amplification.

The fluid to be measured, the flow velocity of which is detected by the flow velocity sensor 24, passes through the small holes 62 of the single mesh member 64. Thereafter, the fluid to be measured is supplied to an unillustrated external apparatus, via a tube member 48 connected to the outlet port of the flow passage 12 (on the side of the second joint section 38b).

In the flow meter 10 according to the embodiment of the present invention, small holes 62a to 62f of the mesh member 64 are arranged concentrically, separated by angles of 60 degrees in the circumferential direction about the center of the small hole 62x, which acts as a reference circle. However, the angle of separation is not limited to 60 degrees. If the number of small holes is increased, for example, when eight small holes are provided, then the angle of separation should be 45 degrees. If ten small holes are provided, the angle of separation should be 36 degrees. If twelve small holes are provided, the angle of separation should be 30 degrees. Further, the phase difference, between the small holes 62a to 62f of one mesh member 64a and the small holes 62a to 62f of another mesh member 64b, is not limited to 90 degrees. The phase difference angle can appropriately be selected depending on the number of small holes employed. The phase difference angle should appropriately be set so as to be larger than the angle of separation.

More specifically, in the embodiment of the present invention, an appropriate phase difference is provided in the circumferential direction between one mesh member 64a and another mesh member 64b, which are adjacent to each other. In contrast to the unillustrated mesh member of the conventional technique, which employs lattice-shaped (square or rectangular) meshes, the plurality of circularly shaped small holes 62a to 62f are arranged concentrically, while being separated by equal angles in the circumferential direction about the center of the small hole 62x, which acts as a reference circle. The mesh shapes, through which the pressure fluid (fluid to be measured) passes, comprise overlapping portions composed of a substantially convex lens-shaped form, in order to decrease the passage area thereof. A throttling action is exerted on the pressure fluid that passes through the overlapping portions. Further, the plurality of circularly shaped small holes 62a to 62f are separated from each other by equal angles in the circumferential direction, and are arranged concentrically in order to preserve the isotropic property of the pressure fluid allowed that passes through the small holes 62a to 62f. Accordingly, a more advanced rectifying effect can be achieved.

As described above, in the embodiment of the present invention, pressure fluid passes through overlapping portions between the circular small holes 62a to 62f of one mesh member 64a and the circular small holes 62a to 62f of another mesh member 64b, which are arranged adjacently to one another in the axial direction. Accordingly, a throttling function is effected for throttling the flow rate of the pressure fluid. Further, an isotropic property is applied to the pressure fluid that passes through the plurality of mesh members 64, which are stacked in accordance with a proper relational arrangement among the plurality of small holes 62a to 62f. Accordingly, uneven flows, and disturbances in the pressure fluid that flows through the flow passage 12, can be suppressed. The rectifying effect thereof can be significantly enhanced, as compared with the conventional technique.

Further, in the embodiment of the present invention, the rectifying module 60 is constructed by alternately stacking the plurality of mesh members 64, each having a plurality of circular small holes 62a to 62f therein, and the plurality of ring-shaped spacers 66 in the axial direction. Accordingly, operations for assembling the rectifying module 60 with respect to the flow passage 12 in the body 14 can easily be performed.

Although certain preferred embodiments of the present invention have been shown and described in detail, it should be understood that various changes and modifications may be made therein without departing from the scope of the appended claims.

What is claimed is:

1. A flow meter comprising a main body section with a flow passage formed therein for allowing a fluid to be measured to pass therethrough, and a flow velocity sensor fixed to a seating surface facing said flow passage for detecting a flow velocity of said fluid to be measured that flows through said flow passage, said flow meter further comprising:
a rectifying mechanism disposed on an upstream side of said flow passage arranged with said flow velocity sensor,
wherein said rectifying mechanism comprises a rectifying module including a plurality of non-lattice shaped mesh members formed with a plurality of circular small holes therein and ring-shaped spacers, said plurality of mesh members and said plurality of spacers being alternately stacked in an axial direction and integrally joined to one another, and
wherein said mesh members have identical structures, in which said plurality of small holes are concentric and are separated from each other by equal angles in a circumferential direction about a center of a reference small hole in a continuous relationship, and wherein a phase angle difference is provided in said circumferential direction between one mesh member and another mesh member, which are adjacent to each other in said axial direction, so that overlapping portions are provided between said circular small holes of said one mesh member and said circular small holes of the other mesh member corresponding thereto in said axial direction.

2. The flow meter according to claim 1, wherein said rectifying module comprises a cylindrical member in which said plurality of mesh members and said spacers are joined to one another by means of thermal diffusion bonding.

3. The flow meter according to claim 2 further comprising a clip member for fixing said flow velocity sensor to said seating surface facing said floe passage, wherein said clip member includes a substantially flat plate-shaped plate section.

4. The flow meter according to claim 1, further comprising a clip member for fixing said flow velocity sensor to said seating surface facing said flow passage, wherein said clip member includes a substantially flat plate-shaped plate section and a pair of legs bent in a direction substantially perpendicular to said plate section on both sides of said plate section.

5. The flow meter according to claim 4, wherein a retaining hole for retaining said flow velocity sensor is formed in said plate section.

6. The flow meter according to claim 4, wherein said plate section comprises a first linear stepped section and a second linear stepped section, which apply resiliency to said pair of legs.

7. The flow meter according to claim 4, wherein fastening sections composed of holes are formed in said pair of legs, respectively, and a pair of fastening pawls, which engage with said fastening sections, are disposed on said main body section.

8. The flow meter according to claim 1, wherein an angle of separation in said circumferential direction of said plurality of small holes disposed about a center of said reference small hole is set to 60 degrees, and wherein a phase angle difference in said circumferential direction of said small holes between one mesh member and the other mesh member, which are adjacent to one another in said axial direction, is set to 90 degrees.

* * * * *